Patented Dec. 15, 1931                                                                      1,836,927

UNITED STATES PATENT OFFICE

EDUARD LINCKH AND HANS HAEUBER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

REMOVAL OF ACETYLENE FROM GASES

No Drawing. Application filed November 26, 1930, Serial No. 498,505, and in Germany December 4, 1929.

The present invention relates to the removal of acetylene from gases.

When gas mixtures of any origin are liquefied by strong cooling for the purpose of isolating the single constituents, or when mixtures of hydrocarbons are exposed to high temperatures for the purpose of converting them into other hydrocarbons the presence even of traces of acetylene is often very injurious. In the former case the acetylene is also liquefied and may give rise to explosions and in the latter case the presence of acetylene is one of the causes of the formation of depositions of carbon which takes place on and in the catalysts.

It has already been proposed to pass gases containing acetylene over bauxite or catalysts containing nickel or iron, for example at temperatures above 300° C., in order to convert the acetylene into innocuous substances. With gases which contain certain olefines, these gas components react in the presence of the said catalysts in an undesirable manner at temperatures of 300° C. and more. Furthermore, the catalysts containing nickel or iron hitherto employed are very sensitive to poisoning by sulphur.

We have now found that by leading gases of any composition and origin, which contain acetylene at elevated temperatures ranging from about 100° to 400° C. over a mixed catalyst prepared from both chromium and nickel salts, if desired, with the addition of other salts, the acetylene is completely removed. By the term "salt" we understand also the oxides and hydroxides since these latter compounds may be regarded as the salts of the metals in question with water. The acetylene in the case of gases containing hydrogen or having hydrogen admixed therewith is partly hydrogenated into ethane and partly polymerized into hydrocarbons of higher molecular weight; again in other cases it is removed by polymerization alone, and in the case of the treatment of gases containing large amounts of oxygen, such as in the purification of air, the acetylene is removed by oxidation. When working with the catalysts in accordance with the present invention a very high degree of purification is attained at very low temperatures. Moreover, the catalysts in accordance with the present invention are substantially immune from poisoning by sulphur.

Nitrates, halides, carbonates of chromium and nickel may be mentioned as examples of salts suitable for the preparation of the catalyst and good results are also obtained with the hydroxides of the said metals. The catalysts may also be employed deposited on carriers such as fireclay, pumice stone, kaolin, active carbon, silica gel or alumina in the manner already known. Small amounts, for example, up to 10 per cent by weight, but preferably up to 5 per cent of manganese, silver, copper, gold, uranium, vanadium, titanium, thallium, zirconium, aluminium, tin, lead, bismuth, mercury or metals of the platinum group or salts thereof, or salts of the alkali metals or the alkaline earth metals or rare earth metals may also be admixed with the said catalysts. The catalysts may be prepared, for example, by precipitation from solutions of the corresponding metal salts and calcination of the resulting precipitates. As examples of the gases from which acetylene may be removed in accordance with the present invention may be mentioned coke oven gas, illuminating gas, low temperature carbonization gas, cracking gases, oil gas, waste gases from destructive hydrogenations, gases obtained by the thermal, electric or electrothermal treatment of hydro-carbons, for example of methane, if desired, after the main portion of acetylene has been recovered from the said gases by other means.

In the gas mixtures from which the acetylene is to be removed by hydrogenation, at least two volumes of hydrogen for each volume of acetylene must be present, but in the case of gases very poor in acetylene, the proportion must be considerably higher. An excess of hydrogen is advantageous. The process is preferably carried out at temperatures of between 100° and 200° C., in the case of hydrogen containing gases and preferably at temperatures of between 200° and 400° C. in cases where the acetylene is removed by oxidation, for example with air or other gases containing oxygen.

The process may be carried out at slightly reduced, ordinary or elevated pressures. Pressures ranging between 0.5 and 200 atmospheres or more have been found to be very suitable in practice, among them pressures of 1, 10 and 100 atmospheres.

The following examples will further illustrate the nature of this invention, but the invention is not restricted to these examples. The parts are by weight.

*Example 1*

30 parts of nickel nitrate and 160 parts of chromic anhydride are calcined and the product is reduced with hydrogen. A low temperature carbonization gas prepared from brown coal which has been freed from hydrogen sulphide and carbon dioxide but which contains about 26 per cent of olefines and about 0.5 per cent of acetylene is led at about 100° C. over the catalyst thus prepared.

After leaving the catalyst chamber the gas is free from acetylene.

*Example 2*

A catalyst is prepared by calcining 30 parts of pyrolusite, 80 parts of chromic anhydride, 30 parts of nickel nitrate and 7 parts of silver nitrate and reducing the product with hydrogen. Hydrogen which has been prepared by the thermal decomposition of methane and which contains several per cent of acetylene is passed over the catalyst at 100° C.

After leaving the catalyst chamber the hydrogen is free from acetylene.

The products formed from the acetylene may be removed in any known or suitable manner.

*Example 3*

4 cubic metres of cracking gas, which contains about 26 per cent of olefines, 0.5 per cent of acetylene and small amounts of hydrogen sulphide and organic compounds of sulphur are passed hourly at a temperature of between about 150° and 200° C. over 5 litres of a catalyst prepared from 160 parts of commercial chromium trioxide and 30 parts of commercial nickel nitrate contained as a layer of a depth of about 30 centimetres in a reaction vessel. The gas leaving the catalyst is free from acetylene. No decrease in the activity of the catalyst is observed even after it had been in use for about 4 weeks.

*Example 4*

2 to 4 cubic metres of air containing 0.5 per cent by volume of acetylene are passed over 12 litres of the catalyst described in Example 3, at a temperature of 350° C. The gas leaving the catalyst is free from acetylene, the latter having been oxidized to carbon dioxide and water. No deposition of carbon is formed on the catalyst even after this has been in use for 14 days.

What we claim is:

1. A process for the removal of acetylene from gases containing the same which comprises passing such gas at an elevated temperature ranging from 100° to 400° C. over a catalyst comprising a salt of nickel and a salt of chromium.

2. A process for the removal of acetylene from gases containing the same which comprises passing such gas at an elevated temperature ranging from 100° to 400° C. over a catalyst comprising a salt of nickel and a salt of chromium and up to 10 per cent of a metal selected from the group consisting of manganese, silver, copper, gold, uranium, vanadium, titanium, thallium, zirconium, aluminum, tin, lead, bismuth, mercury and the metals of the platinum group.

3. A process for the removal of acetylene from gases containing the same which comprises passing such gas at an elevated temperature ranging from 100° to 400° C. over a catalyst comprising a salt of nickel and a salt of chromium and up to 10 per cent of a salt of a metal selected from the group consisting of manganese, silver, copper, gold, uranium, tin, lead, bismuth, mercury and the metals of the platinum group.

4. A process for the removal of acetylene from gases containing the same which comprises passing such gas at an elevated temperature ranging from 100° to 400° C. over a catalyst comprising a salt of nickel and a salt of chromium and up to 10 per cent of a salt of a metal selected from the group consisting of alkali metals, alkaline earth metals, and rare earth metals.

5. A process for the removal of acetylene from gases containing the same together with hydrogen which comprises passing such gas at an elevated temperature between 100° and 200° C. over a catalyst comprising a salt of nickel and a salt of chromium.

6. A process for the removal of acetylene from gases containing the same which comprises subjecting such gas to oxidation at a temperature between 200° and 400° C. in the presence of a catalyst comprising a salt of nickel and a salt of chromium.

7. A process for the removal of acetylene from gases containing the same which comprises subjecting such gas to the action of a gas containing oxygen at a temperature between 200° and 400° C. in the presence of a catalyst comprising a salt of nickel and a salt of chromium.

In testimony whereof we have hereunto set our hands.

EDUARD LINCKH.
HANS HAEUBER.